United States Patent
Ayirala et al.

(10) Patent No.: US 12,492,621 B2
(45) Date of Patent: Dec. 9, 2025

(54) ENHANCED OIL RECOVERY USING FATTY ACID SALTS

(71) Applicants: SAUDI ARABIAN OIL COMPANY, Dhahran (SA); KING FAHD UNIVERSITY OF PETROLEUM & MINERALS, Dhahran (SA)

(72) Inventors: Subhash Ayirala, Dhahran (SA); Ahmed Gmira, Dhahran (SA); Theis Solling, Dhahran (SA); Ali Binabdi, Dhahran (SA); Ali Yousef, Dhahran (CA)

(73) Assignees: SAUDI ARABIAN OIL COMPANY, Dhahran (SA); KING FAHD UNIVERSITY OF PETROLEUM & MINERALS, Dhahran (SA)

( * ) Notice: Subject to any disclaimer, the term of this patent is extended or adjusted under 35 U.S.C. 154(b) by 0 days.

(21) Appl. No.: 18/649,570

(22) Filed: Apr. 29, 2024

(65) Prior Publication Data
US 2025/0334033 A1 Oct. 30, 2025

(51) Int. Cl.
*E21B 43/16* (2006.01)
*C09K 8/584* (2006.01)

(52) U.S. Cl.
CPC .............. *E21B 43/16* (2013.01); *C09K 8/584* (2013.01)

(58) Field of Classification Search
None
See application file for complete search history.

(56) References Cited

U.S. PATENT DOCUMENTS

| | | | | |
|---|---|---|---|---|
| 3,866,685 | A | * | 2/1975 | Friedman ............... C09K 8/506 166/292 |
| 4,232,739 | A | * | 11/1980 | Franklin ................ C09K 8/905 166/275 |
| 4,434,062 | A | | 2/1984 | Oswald et al. |
| 6,419,017 | B1 | * | 7/2002 | Metcalf .................... C09K 8/44 166/295 |
| 8,815,785 | B2 | | 8/2014 | Welton et al. |
| 2007/0095534 | A1 | * | 5/2007 | Hughes ................ C09K 8/502 166/292 |
| 2015/0013987 | A1 | | 1/2015 | Underwood et al. |
| 2016/0326829 | A1 | * | 11/2016 | Dolog ................ E21B 33/1277 |
| 2021/0363407 | A1 | | 11/2021 | Farmer et al. |

OTHER PUBLICATIONS

Ivy Sagbana, P. and Abushaikha, A.S. 2021. A comprehensive review of the chemical-based conformance control methods in oil reservoir, Journal of Petroleum Exploration and Production Technology (2021) 11:2233-2257.
Bai, B., Leng, J. and Wei, M. 2022. A comprehensive review of in-situ polymer gel simulation for conformance control, Petroleum Science 19: 189-202.

* cited by examiner

*Primary Examiner* — Andrew Sue-Ako
(74) *Attorney, Agent, or Firm* — Vorys, Sater, Seymour and Pease LLP

(57) ABSTRACT

Fatty acid salts may be used in subterranean reservoirs for conformance control. For example, methods may include: introducing a fatty acid salt including a fatty acid and a metal cation including a transition metal or a lanthanide metal to a subterranean reservoir, wherein the subterranean reservoir includes oleaginous hydrocarbons; contacting the fatty acid salt with the oleaginous hydrocarbons, wherein the fatty acid salt and the oleaginous hydrocarbons form a precipitant; and recovering oleaginous hydrocarbons from the subterranean reservoir.

15 Claims, 8 Drawing Sheets

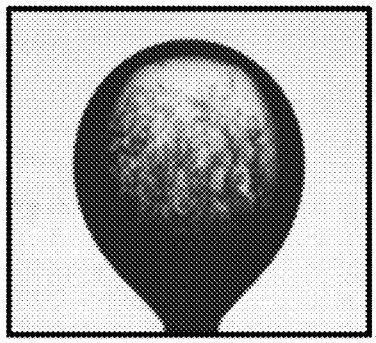 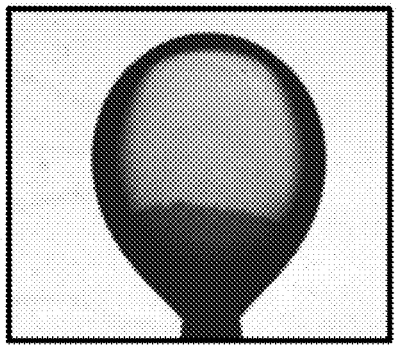 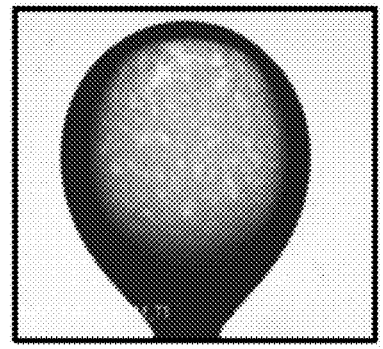
FIG. 1A            FIG. 1B            FIG. 1C
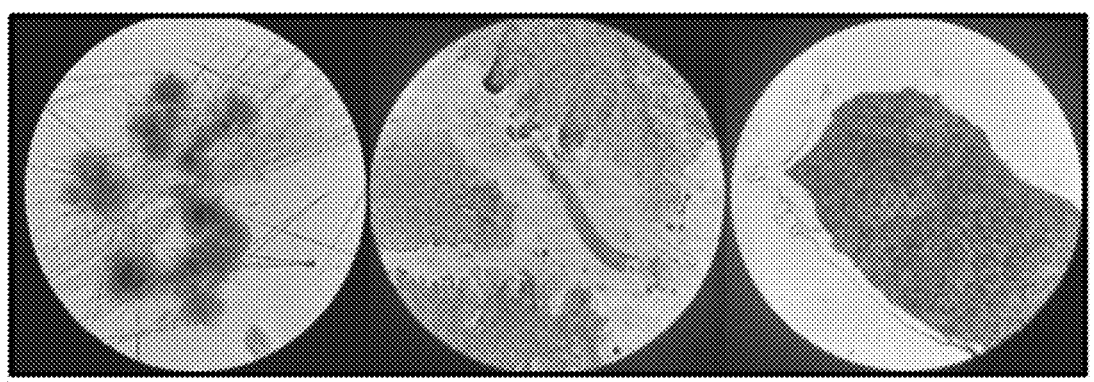
FIG. 2A            FIG. 2B            FIG. 2C

ENHANCED OIL RECOVERY USING FATTY ACID SALTS

FIELD OF THE DISCLOSURE

The present disclosure relates generally to methods and systems for enhanced hydrocarbon recovery.

BACKGROUND OF THE DISCLOSURE

Enhanced hydrocarbon recovery (such as, enhanced oil recovery, EOR) refers to methods and systems that inject fluids through an injection well to a downhole location to encourage release of the hydrocarbons within a reservoir and mobilization of the hydrocarbons toward a production well. The injected fluids may promote release and mobilization of hydrocarbons through a variety of mechanisms including oil swelling, viscosity reduction, and wettability alteration, for example. Injected fluids may include various components for interacting chemically and/or physically with minerals of a subterranean reservoir to promote hydrocarbon mobilization.

Conformance of a subterranean reservoir refers to uniformity of passages therein. Conformance control is used within subterranean reservoirs to increase sweep efficiency, as uniform passages allow for increased efficiency when flooding a subterranean reservoir to promote hydrocarbon mobilization for extraction. Conventional methods of conformance control (such as use of various existing polymers, gels, foams, resins, and the like) may be limited in sweep efficiency and thus may limit hydrocarbon recovery capabilities.

SUMMARY OF THE DISCLOSURE

Various details of the present disclosure are hereinafter summarized to provide a basic understanding. This summary is not an exhaustive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

Nonlimiting methods of the present disclosure may include: introducing a fatty acid salt comprising a fatty acid and a metal cation comprising a transition metal or a lanthanide metal to a subterranean reservoir, wherein the subterranean reservoir comprises oleaginous hydrocarbons; contacting the fatty acid salt with the oleaginous hydrocarbons, wherein the fatty acid salt and the oleaginous hydrocarbons form a precipitant; and recovering oleaginous hydrocarbons from the subterranean reservoir.

Nonlimiting methods of the present disclosure may include: introducing a first aqueous solution that includes a fatty acid and a second aqueous solution comprising a metal cation comprising a transition metal or a lanthanide metal to a subterranean reservoir, wherein the subterranean reservoir comprises oleaginous hydrocarbons; mixing the fatty acid and the metal cation to form a fatty acid salt; contacting the fatty acid salt with the oleaginous hydrocarbons, wherein the fatty acid salt and the oleaginous hydrocarbons form a precipitant; and recovering oleaginous hydrocarbons from the subterranean reservoir.

Nonlimiting methods of the present disclosure may include: introducing a fatty acid and a metal cation comprising a transition metal or a lanthanide metal to a subterranean reservoir, wherein the subterranean reservoir comprises oleaginous hydrocarbons; reacting the fatty acid and the metal cation to form a fatty acid salt; mixing the fatty acid and the metal cation to form a fatty acid salt; contacting the fatty acid salt with the oleaginous hydrocarbons, wherein the fatty acid salt and the oleaginous hydrocarbons form a precipitant; introducing an aqueous flooding fluid into the subterranean reservoir after introduction of the fatty acid salt.

Any combination of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

BRIEF DESCRIPTION OF THE DRAWINGS

FIGS. 1A-1C are Buoyant drop images of samples compositions A1 to A3.

FIGS. 2A-2C are microscopy images of example compositions A1 to A3.

DETAILED DESCRIPTION

Figure 3A:
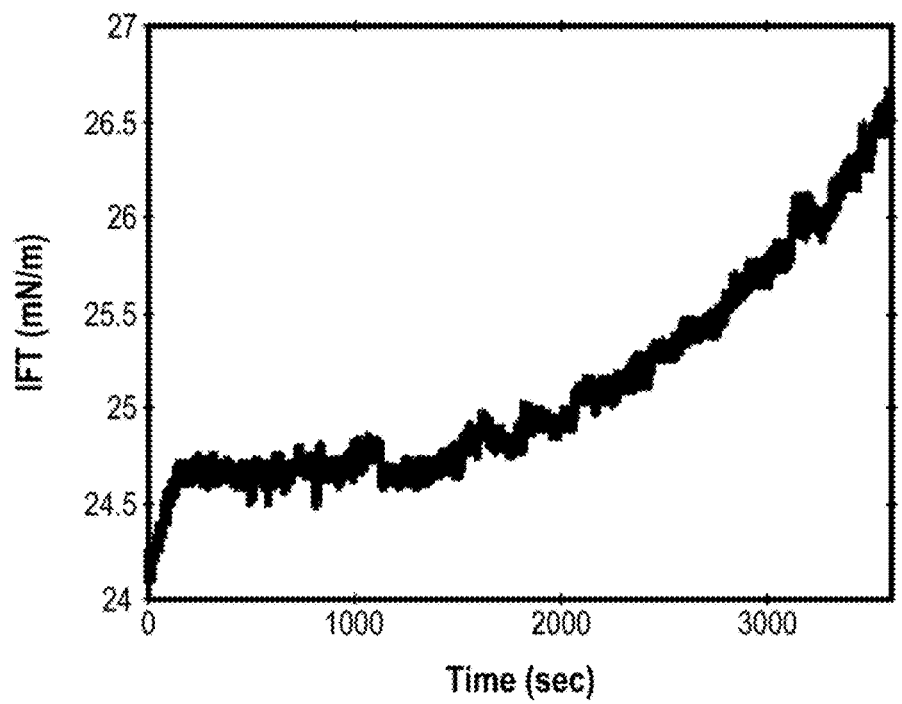
FIGS. 3A-3J are graphs of interfacial tension as a function of time for example compositions.
Figure 3B:
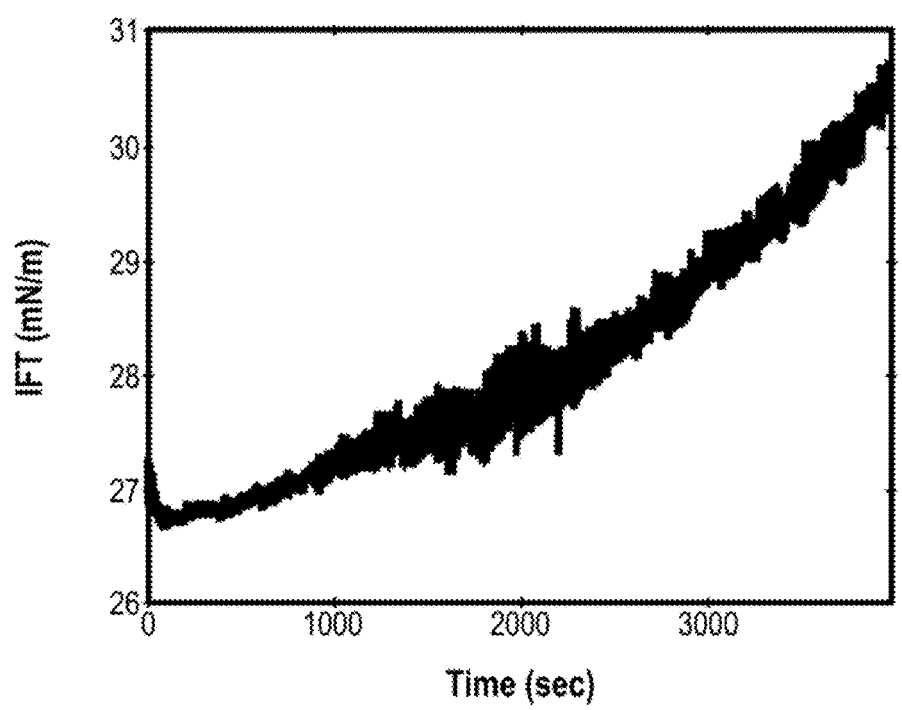
Figure 3C:
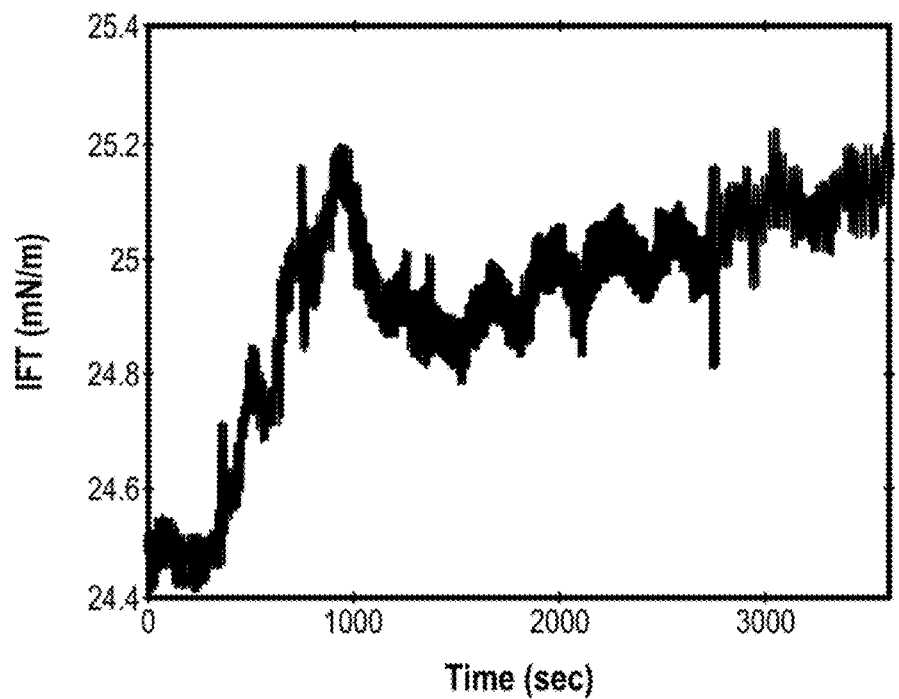
Figure 3D:
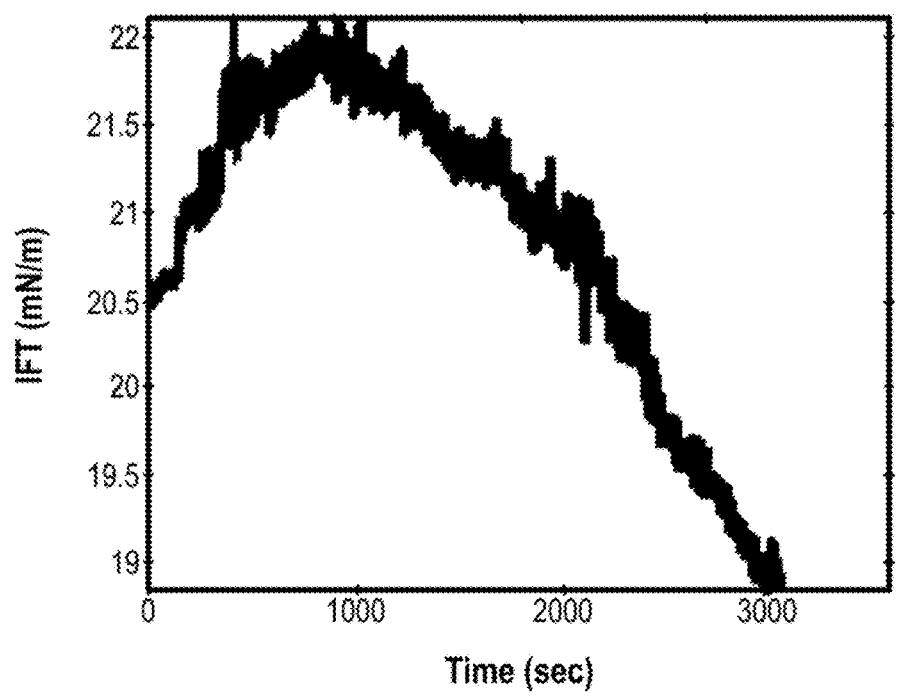
Figure 3E:
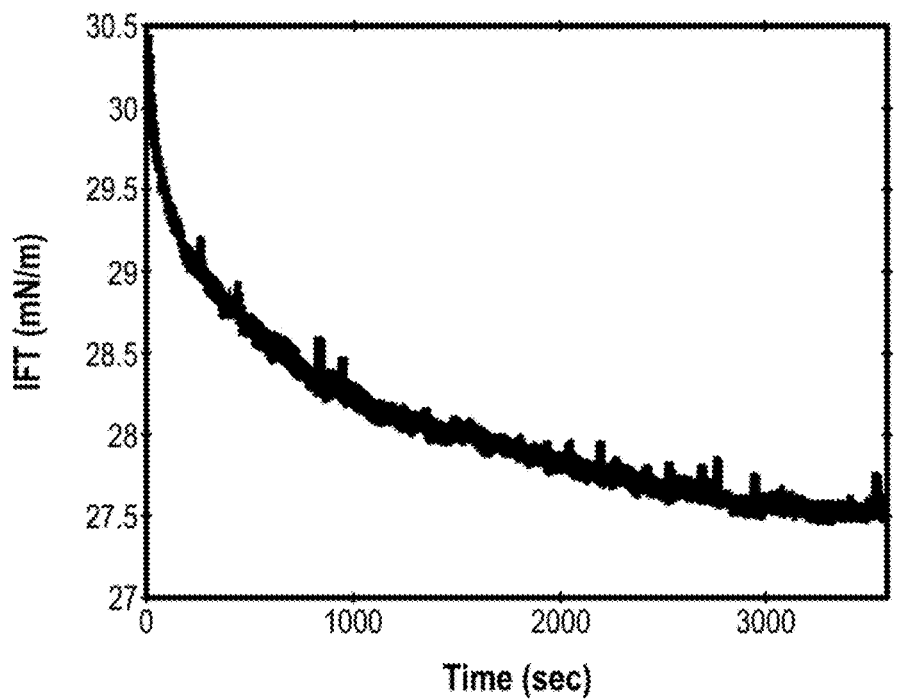
Figure 3F:
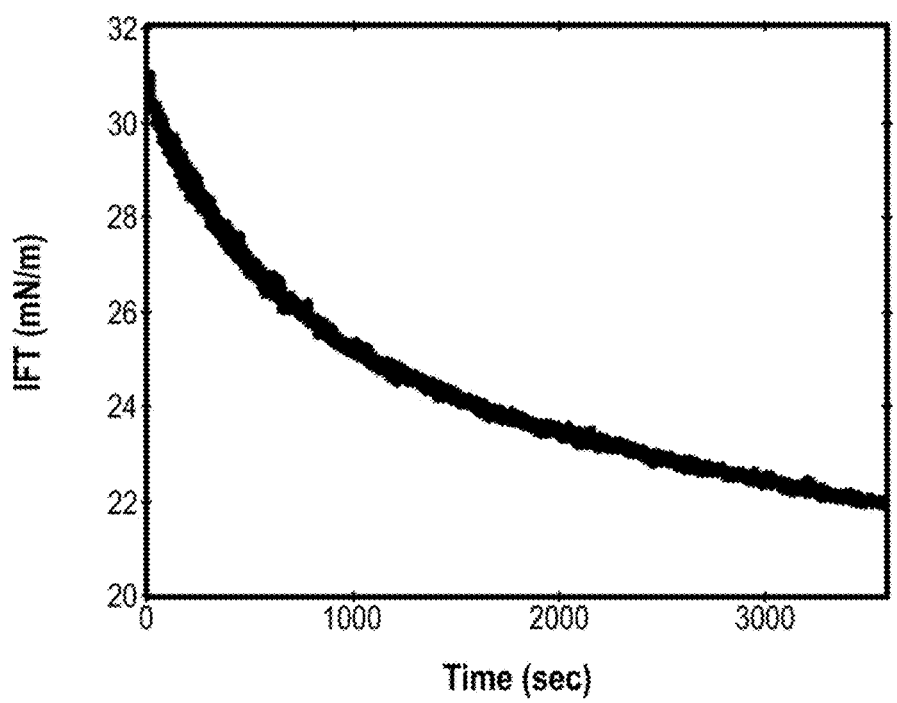
Figure 3G:
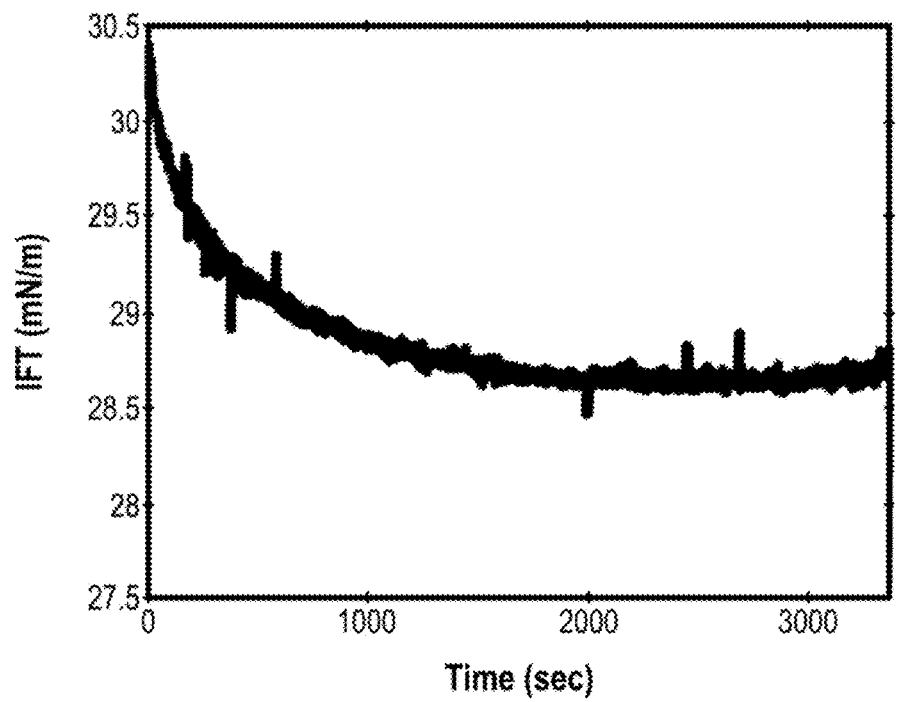
Figure 3H:
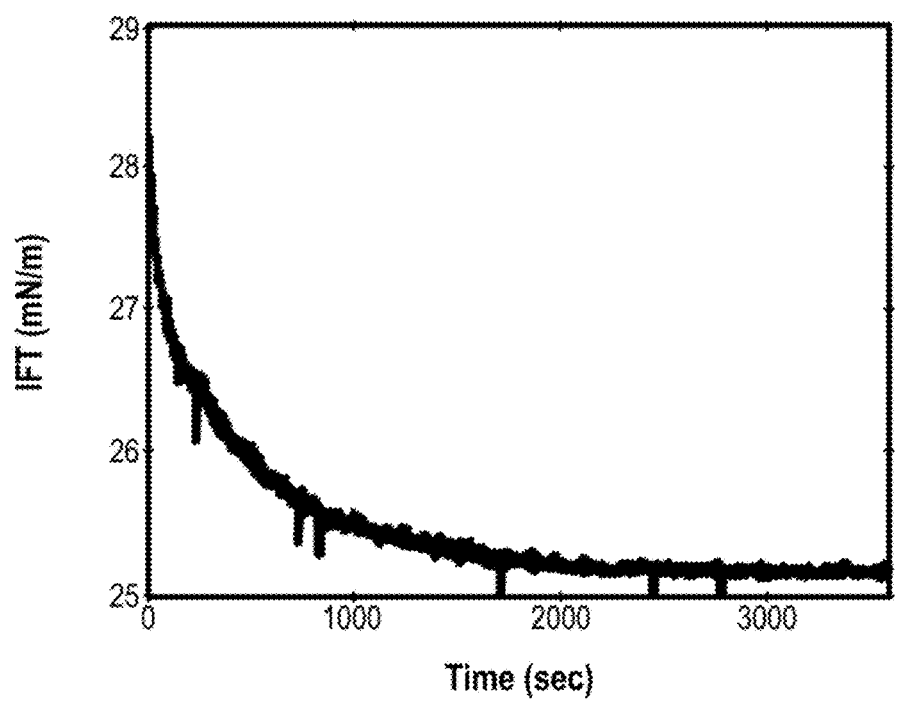
Figure 3I:
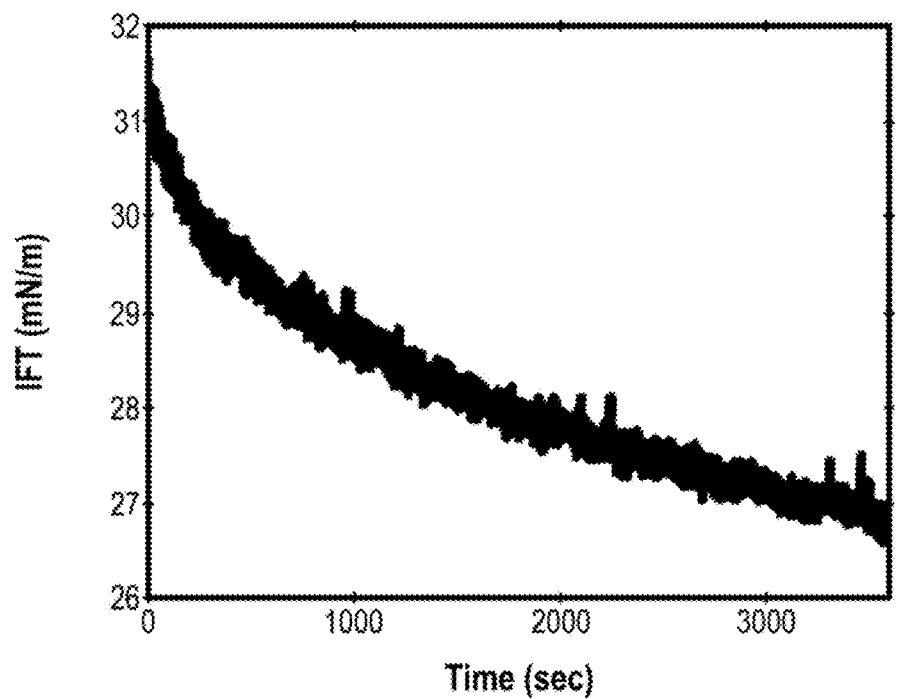
Figure 3J:
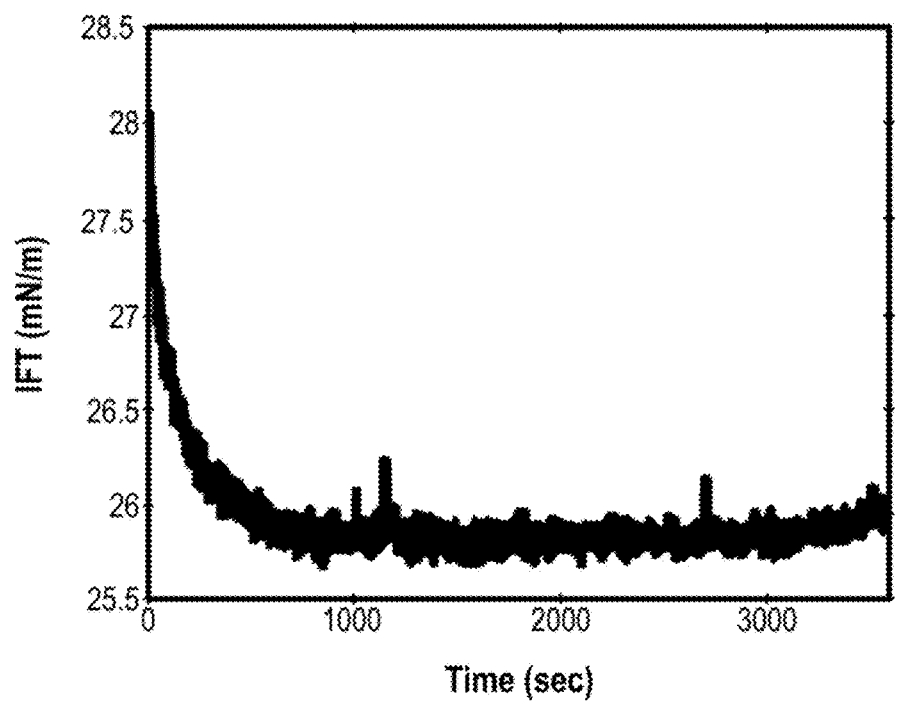

Embodiments in accordance with the present disclosure generally relate to methods and systems for enhanced hydrocarbon recovery.

As used herein, the term "oleaginous hydrocarbon," "oleaginous hydrocarbons" and grammatical variations thereof, refers to any at least partially liquid or solid hydrocarbon-based substance having oleaginous properties. Examples of oleaginous hydrocarbons may include, but are not limited to, petroleum, oil (such as crude oil), bitumen, tar, synthetic hydrocarbons, the like, and any combination thereof.

As used herein, the term "fatty acid" refers to a saturated or unsaturated carboxylic acid containing about 6 or more carbon atoms. The fatty acid includes a single carbon atom in the carboxylic acid (—COOH) and the other carbon atoms are hydrocarbyl. The hydrocarbyl is a hydrocarbon radical.

As used herein, the term "fatty acid salt" refers to a fatty acid whose acidic proton is replaced with a metal cation.

As used herein, the term "transition metals" includes the elements in groups III-XII according to the IUPAC naming convention and excludes the lanthanide series and actinide series and elements 109 to 112 (Mt, Ds, Rg, and Cn).

As used herein, the term "late transition metals" includes the elements in groups IX-XII according to the IUPAC naming convention.

As used herein, the term "lanthanide metals" includes elements in the lanthanide series, which includes elements 57 to 71.

As used herein, the terms "precipitant", "precipitants" and grammatical variations thereof, refer to an insoluble compound or a compound that becomes insoluble due to chemical changes or physical changes as a result of its current environment.

The present disclosure includes methods and systems of introducing a fatty acid salt comprising a fatty acid and a metal cation to a subterranean reservoir and subsequently interacting or otherwise contacting the fatty acid salt with oleaginous hydrocarbons of the subterranean reservoir to form a precipitant Thus, the permeability of one or more channels within the subterranean reservoir is reduced upon the formation of the precipitant. Such reduction in permeability may allow for increased conformance of channels within the subterranean reservoir, thus potentially increasing sweep efficiency of flooding fluid operations and mobilizing hydrocarbons within the subterranean reservoir.

The fatty acid salt may be introduced to the subterranean reservoir or may form within the subterranean reservoir. In some embodiments, the fatty acid may be introduced to the subterranean reservoir within a first aqueous fluid, and the metal cation may be introduced to the subterranean reservoir within a second aqueous fluid. Alternately, the fatty acid and the metal cation may be introduced to the subterranean reservoir concurrently within an aqueous fluid and/or the fatty acid salt may be pre-formed and introduced to the subterranean reservoir within an aqueous fluid. Each of the fluids (such as a first aqueous fluid, a second aqueous fluid, or an aqueous flooding fluid) of the present disclosure may include a suspension, solution, or any combination thereof. That is, the fatty acid, the metal cation, and/or the fatty acid salt may be soluble, partially soluble, or insoluble within an aqueous fluid.

In one or more embodiments, the fatty acid and the metal cation may be introduced separately to the subterranean reservoir, in which case the fatty acid salt may form within the subterranean reservoir or during delivery thereto. Such methods of the present disclosure may comprise: introducing a first aqueous fluid comprising a fatty acid to a subterranean reservoir; introducing a second aqueous fluid comprising the metal cation to the subterranean reservoir; and reacting the fatty acid and the metal cation to form the fatty acid salt within the subterranean reservoir and/or during delivery thereto; wherein the subterranean reservoir comprises oleaginous hydrocarbons therein.

In one or more embodiments, the fatty acid and the metal cation may be introduced to the subterranean reservoir concurrently, including wherein the fatty acid and the metal cation are reacted during the delivery of an aqueous fluid and/or within the subterranean reservoir. In various embodiments, the fatty acid and the metal cation may be pre-reacted to form a fatty acid salt prior to being introduced to the subterranean reservoir.

Upon introduction of the fatty acid salt to the subterranean reservoir having oleaginous hydrocarbons, the fatty acid salt may be used for conformance control to reduce permeability within the subterranean reservoir. Such methods of the present disclosure may comprise: contacting the fatty acid salt with the oleaginous hydrocarbons so as to form a precipitant at an interface (such as an interface between the fatty acid salt and the oleaginous hydrocarbons). Formation of such a precipitant at the interface may allow for increased conformance of the subterranean reservoir, thus increasing sweep efficiency of subsequent fluid introduction.

In some embodiments, the fluid introduction to the subterranean reservoir may include an aqueous flooding fluid. In one or more embodiments, the aqueous flooding fluid may be introduced after the introduction of the fatty acid salt and subsequent reaction. Without intent to be bound by theory, it is believed that the aqueous flooding fluid may promote hydrocarbon mobilization within the subterranean reservoir, thus allowing a portion of the hydrocarbon within the subterranean reservoir to be extracted.

In various embodiments, the aqueous flooding fluids may optionally include a polymer. Examples of polymers for use in aqueous flooding fluids may include, but are not limited to a polyacrylamide (such as hydrolyzed polyacrylamide, sulfonated polyacrylamide), a biopolymer (such as xanthan gum, guar gum), the like, or any combination thereof. Polymers, if included in aqueous flooding fluids, may include a concentration of about 1 ppm to 10,000 ppm, or about 1 ppm to about 1,000 ppm, or about 1 ppm to about 500 ppm, or about 500 ppm or less, or about 250 ppm or less.

Fluids, such as the first aqueous fluid, the second aqueous fluid, and the aqueous flooding fluids, may be introduced in various quantities for use according to the present disclosure and may be introduced in any combination. In some embodiments, the fluids including a fatty acid, a metal cation, or a fatty acid salt may be introduced to the subterranean reservoir in one or more main slugs, and the aqueous flooding fluid may be introduced to the subterranean reservoir in one or more additional slugs. "Slug," "slugs," and grammatical variations thereof, as used herein, refer to a volume of fluid introduced to the subterranean reservoir at a given time. The one or more main slugs may each have a volume of about 0.01 pore volumes (PV) to about 0.5 PV, or about 0.1 PV to about 0.3 PV. The one or more additional slugs may each have a volume of about 0.01 PV to about 2 PV, or about 0.1 PV to about 1.5 PV, or about 0.1 PV to about 1 PV, or about 0.5 PV to about 1 PV. "Pore volume," and grammatical variations thereof, as used herein, refers to an accessible volume for fluid introduction within a subterranean reservoir. The one or more main slugs may have various concentrations of the fatty acid, the metal cation, or the fatty acid salt. The concentrations may be the same or may be different. The one or more main slugs may have volumes that may be the same or may be different. In one or more embodiments, methods of the present disclosure may include: introduction of 0.1 PV of a first main slug having a first metal cation concentration of 10,000 ppm and a first fatty acid concentration of 2.0 wt %; introduction of 0.1 PV of a second main slug having a second metal cation concentration of 5,000 ppm and a second fatty acid concentration of 1.0 wt %; and introduction of 0.05 PV of a third main slug having a third metal cation concentration of 2,500 ppm and a third fatty acid concentration of 0.5 wt %.

Fluids of the present disclosure, including fluids containing a fatty acid, a metal cation, or a fatty acid salt (such as the first aqueous fluid, the second aqueous fluid) as well as other fluids (such as, an aqueous flooding fluid) may comprise an aqueous fluid as a carrier fluid. Examples of aqueous fluids may include, but are not limited to, freshwater (such as, lake water, stream water, municipal treated water, and the like), brine, unsaturated salt solutions, seawater produced water, formation water, wastewater, the like, or any combination thereof. Such aqueous fluids may include total dissolved solids (TDS) within any suitable range including TDS of about 1 ppm (parts per million) to 150,000 ppm, or about 1,000 ppm to about 150,000 ppm, or about 150,000 ppm or less.

Furthermore, fluids including a fatty acid and/or fatty acid salt may include any suitable variants of the fatty acid and/or fatty acid salt. The fatty acids may be straight chain or branched, and saturated or unsaturated. Some embodiments include straight chain fatty acids derived from natural sources. A nonlimiting list of fatty acids may include caproic acid, enanthic acid, caprylic acid, pelabonic acid, capric acid, undecylic acid, lauric acid, tridecylic acid, myristic acid, pentadecylic acid, palmitic acid, margaric acid, stearic acid, nonadecylic acid, arachidic acid, heneicosylic acid, behenic acid, trioscylic acid, lignoceric acid, pentacosylic acid, cerotic acid, carboceric acid, montanic acid, nonacosylic acid, melissic acid, crotonic acid, cervonic acid, linoleic acid, linolelaidic acid, linolenic acid, arachidonic acid, docosatetraenoic acid, myristoleic acid, palmitoleic acid, sappenic acid, vaccenic acid, paullinic acid, oleic acid, pinolenic acid, stearidonic acid, eleostearic acid, elaidic acid, gondoic acid, gadoleic acid, erucic acid, eicosenoic acid, eicosadiencoic acid, eicosatrienoic acid, eicosatetraenoic acid, docosadienoic acid, nervonic acid, mead acid, adrenic acid, the like, and any combination thereof.

The fatty acids may include a carboxylic acid and $C_5$ to $C_{40}$ aliphatic hydrocarbyl. In some embodiments, the fatty acids may include a $C_5$ to $C_{20}$ fatty acid, or a $C_8$ to $C_{26}$ fatty acid, or a $C_8$ to $C_{16}$ fatty acid, or a $C_8$ to $C_{12}$ fatty acid. The fatty acids may be saturated or unsaturated. The fatty acids of the foregoing size ranges may allow for targeted solubility in various components (such as aqueous fluid, oleaginous hydrocarbons) when used according to the present disclosure. Examples of saturated fatty acids within the foregoing size ranges may include, but are not limited to, decanoic acid (capric acid), dodecanoic acid (lauric acid), the like, or any combination thereof. Lauric acid may be preferred for use in compositions and methods in the present disclosure.

When introduced to the subterranean reservoir in a fluid, the concentration of the fatty acid in the fluid may vary over a considerable range. The concentration of the fatty acid and/or the fatty acid salt is less than saturation in the fluid. In various embodiments of the present disclosure, the fatty acid may have a concentration in the fluid ranging from about 0.1 wt % to about 5 wt %, or about 0.1 wt % to about 4.0 wt %, or about 0.1 wt % to about 3.0 wt %, or about 0.5 wt % to about 3.0 wt %, or about 0.5 wt % to about 2.0 wt %, or about 0.5 wt % to about 1.0 wt %, based on a total weight of the fluid.

A metal cation of the present disclosure may be delivered to the subterranean reservoir as a metal salt. The metal salt may include a salt of a transition metal (such as a halide salt of a transition metal) or a salt of a lanthanide. Examples of metal salts may include, but should not be limited to, transition metal or lanthanide metal salts that contain a copper (II) cation, a neodymium (III) cation, a cerium (III) cation, a zinc (II) cation, the like, or any combination thereof. The counterions for the metal cations may include, but are not limited to, chlorides, bromides, iodides, nitrates, acetates, and the like. In some embodiments of the present disclosure, the metal salt may comprise zinc (II) chloride.

When introduced to the subterranean reservoir in a fluid, the concentration of the metal cation in the form of a metal salt may vary over a considerable range in the fluid. The metal salt may be less than a saturation concentration for the metal salt in the fluid. In one or more embodiments, the metal cation may have a concentration in the fluid of the present disclosure ranging from about 2,500 ppm to about 10,000 ppm, or about 1,000 ppm to about 15,000 ppm, or about 2,500 ppm to about 12,500 ppm, or about 2,500 ppm to about 7,500 ppm, or about 2,500 ppm to about 5,000 ppm, or about 5,000 ppm to about 10,000 ppm, based on a total weight of the fluid.

The fatty acid and the metal cation may be present in similar concentration ranges within an aqueous fluid containing a pre-formed fatty acid salt. The concentration of the fatty acid salt may be present in the fluid in a concentration ranging from about 0.25 wt % to about 6 wt %, or about 0.25 wt % to about 5 wt %, or about 0.75 wt % to about 5 wt %, or about 0.75 wt % to about 4 wt %, or about 0.75 wt % to about 3 wt %, or about 0.75 wt % to about 2 wt %, based on a total weight of the fluid.

When interacting with oleaginous hydrocarbons within the subterranean reservoir, all of the fatty acid may be converted to the corresponding fatty acid salt, or a portion of the fatty acid may remain as free (protonated fatty acid).

Furthermore, the fatty acids, metal cations, metal salts, fatty acid salts and fluids (such as a first aqueous fluid, a second aqueous fluid, an aqueous flooding fluid) containing the foregoing may further include one or more additional components suitable for achieving one or more desired functions (such as in addition to reducing permeability within one or more channels of a subterranean reservoir according to the disclosure herein). Examples of suitable additional components may include, but are not limited to, a salt, a weighting agent, an inert solid, an emulsifier, a dispersion aid, a viscosifying agent, a particulate, a foaming agent, a gas, a pH control additive, a crosslinker, a chelating agent, a scale inhibitor, a solvent, an oxidizer, the like, or any combination thereof.

Any of the fluids (such as a first aqueous fluid, a second aqueous fluid, an aqueous flooding fluid) may be mixed at a remote location from a job site and shipped thereto or may be mixed at a job site. In various embodiments, mixing of the fluid(s) may take place on-the-fly as the fluid is delivered to the subterranean reservoir (such as with the fatty acid salt being formed in situ within the aqueous fluid).

Systems for introducing the fluids of the present disclosure to a subterranean reservoir may include one or more mixing and/or storage tanks for mixing and/or storing the fluids prior to their introduction to the subterranean reservoir. Systems for introducing fluids to a subterranean reservoir may comprise a pump suitable to convey a given fluid to the subterranean reservoir. The pump may include a single pump or may comprise multiple pumps. Additional equipment (such as tanks or skimmers) may be used for removing (such as extracting) and/or storing fluids (including oleaginous hydrocarbons(s)) of the present disclosure after mobilization and/or removal from the subterranean reservoir through a producing well.

Additional nonlimiting components may be present in systems suitable to introduce fluids according to the present disclosure and may include, for example, supply hoppers, valves, condensers, adapters, joints, gauges, sensors, compressors, pressure controllers, pressure sensors, flow rate controllers, flow rate sensors, temperature sensors, the like, or any combination thereof.

Additional Embodiments

Embodiments disclosed herein include:

Embodiment 1. A method comprising: introducing a fatty acid salt comprising a fatty acid and a metal cation comprising a transition metal or a lanthanide metal to a subterranean reservoir, wherein the subterranean reservoir comprises oleaginous hydrocarbons; contacting the fatty acid salt with the oleaginous hydrocarbons, wherein the fatty acid salt and the oleaginous hydrocarbons form a precipitant; and recovering oleaginous hydrocarbons from the subterranean reservoir.

Embodiment 2. The method of Embodiment 1, wherein introducing the fatty acid salt to the subterranean reservoir comprises: introducing a first aqueous fluid comprising the fatty acid to the subterranean reservoir; and introducing a second aqueous fluid comprising the metal cation to the subterranean reservoir; wherein the fatty acid and the metal cation react within the subterranean reservoir to form the fatty acid salt.

Embodiment 3. The method of Embodiment 1 or 2, wherein the fatty acid has a concentration of about 0.5 wt % to about 2.0 wt % in the first aqueous fluid, based on a total weight of the first aqueous fluid.

Embodiment 4. The method of any one of Embodiments 1-3, wherein the metal cation has a concentration of about 2,500 ppm to about 10,000 ppm in the second aqueous fluid, based on a total weight of the second aqueous fluid.

Embodiment 5. The method of Embodiment 1, further comprising: mixing the fatty acid and the metal cation to form the fatty acid salt; and introducing the fatty acid salt to the subterranean reservoir.

Embodiment 6. The method of any one of Embodiments 1-5, further comprising introducing an aqueous flooding fluid into the subterranean reservoir.

Embodiment 7. The method of Embodiment 6, wherein the aqueous flooding fluid comprises: an aqueous fluid with 1,000 ppm to 150,000 ppm total dissolved solids (TDS).

Embodiment 8. The method of any one of Embodiments 6-7, wherein the aqueous flooding fluid comprises a polymer.

Embodiment 9. The method of any one of Embodiments 1-8, wherein the metal cation comprises a metal chloride salt.

Embodiment 10. The method of any one of Embodiments 1-9, wherein the metal cation is selected from zinc, copper, neodymium, or cerium.

Embodiment 11. The method of any one of Embodiments 1-10, wherein the metal cation comprises a copper (II) cation, a neodymium (III) cation, a cerium (III) cation, a zinc (II) cation, or any combination thereof.

Embodiment 12. The method of any one of Embodiments 1-11, wherein the fatty acid comprises a carboxylic acid and $C_5$ to $C_{40}$ aliphatic hydrocarbyl.

Embodiment 13. The method of any one of Embodiments 1-12, wherein the fatty acid comprises a $C_8$ to $C_{26}$ fatty acid.

Embodiment 14. The method of any one of Embodiments 1-13, wherein the fatty acid comprises a $C_6$ to $C_{20}$ fatty acid.

Embodiment 15. The method of any one of Embodiments 1-14, wherein the fatty acid comprises dodecanoic acid.

Embodiment 16. The method of any one of Embodiments 1-15, wherein the oleaginous hydrocarbon comprises petroleum or crude oil.

Embodiment 17. The method of any one of Embodiments 1-16, wherein contacting the fatty acid salt with the oleaginous hydrocarbons promotes formation of a plurality of clusters comprising the oleaginous hydrocarbons and the fatty acid salt, crystallization of the oleaginous hydrocarbons and the fatty acid salt, or any combination thereof.

Embodiment 18. A method comprising: introducing a first aqueous solution comprising a fatty acid and a second aqueous solution comprising a metal cation comprising a transition metal or a lanthanide metal to a subterranean reservoir, wherein the subterranean reservoir comprises oleaginous hydrocarbons; mixing the fatty acid and the metal cation to form a fatty acid salt; contacting the fatty acid salt with the oleaginous hydrocarbons, wherein the fatty acid salt and the oleaginous hydrocarbons form a precipitant; and recovering oleaginous hydrocarbons from the subterranean reservoir.

Embodiment 19. A method comprising: introducing a fatty acid and a metal cation comprising a transition metal or a lanthanide metal to a subterranean reservoir, wherein the subterranean reservoir comprises oleaginous hydrocarbons; reacting the fatty acid and the metal cation to form a fatty acid salt; mixing the fatty acid and the metal cation to form a fatty acid salt; contacting the fatty acid salt with the oleaginous hydrocarbons, wherein the fatty acid salt and the oleaginous hydrocarbons form a precipitant; introducing an aqueous flooding fluid into the subterranean reservoir after introduction of the fatty acid salt.

Embodiment 20. The method of Embodiment 19, wherein introducing the fatty acid and the metal cation to the subterranean reservoir comprises: introducing a first main slug comprising the fatty acid and the metal cation to the subterranean reservoir, wherein the first main slug has a first fatty acid concentration, and wherein the first main slug has a first metal cation concentration; introducing a second main slug comprising the fatty acid and the metal cation to the subterranean reservoir, wherein the second main slug has a second fatty acid concentration, and wherein the second main slug has a second metal cation concentration; and wherein the first fatty acid concentration is different from the second fatty acid concentration, and wherein the first metal cation concentration is different from the second metal cation concentration.

EXAMPLES

Experiment 1: Optical Inspection

Sample compositions A1-A3 were formed and included 0.1 M (mol/L) metal cations and 1.6 mol % dodecanoic acid to water. Sample A1 included $Cu^{2+}$ in sample A1; Sample A2 included $Nd^{3+}$, and sample A3 contained $Ce^{2+}$. The Samples were left to sit for 3,000 seconds at atmospheric conditions (25° C. and 1 bar). Buoyant drop images of samples A1-A3 are shown in FIGS. 1A-1C, respectively. Microscopy image of sample A1 is depicted in FIG. 2A; microscopy image of sample A2 is depicted in FIG. 2B; and microscopy image of sample A3 is shown in FIG. 2C. Specimens in FIG. 2A and FIG. 2C are under 50× magnification. Specimens in FIG. 2B are under 80× magnification. Samples A1 and A3 demonstrated at least partial solidification, while sample A2 did not show indications of solidifying, demonstrating the ability of $Cu^{2+}$ and $Ce^{2+}$ to crystalize in the presence of a fatty acid.

Experiment 2: Interfacial Tension with Dodecanoic Acid

Sample compositions B1-B10 were formed and included 0.1 M (mol/L) metal cations and 1.6 mol % dodecanoic acid in water. Metal cations in each sample are shown in Table 1 below.

TABLE 1

| Metal cations in samples. | |
|---|---|
| Sample | Metal Cation |
| B1 | $Ce^{3+}$ |
| B2 | $Cu^{2+}$ |
| B3 | $Nd^{3+}$ |
| B4 | $Zn^{2+}$ |
| B5 | $Cr^{3+}$ |
| B6 | $Fe^{2+}$ |
| B7 | $Li^{2+}$ |
| B8 | $Mn^{2+}$ |
| B9 | $Nb^{5+}$ |
| B10 | $Ni^{2+}$ |

Interfacial tension (IFT) measurements were taken with an Attension Theta Optical Tensiometer (Biolin Scientific) for all samples over a course of 3,000 seconds. Results of testing for samples B1-B10 are shown in FIGS. 3A-3J, respectively. The results in FIGS. 3A-3J indicated that samples including $Ce^{3+}$, $Cu^{2+}$, $Nd^{3+}$, and $Zn^{2+}$ cations are able to at least partially solidify in the presence of a fatty acid. As shown, for samples B1-B4, interfacial tension (IFT) generally increased over time, indicating at least partial formation of a precipitant during the course of the experiment. For samples B1-B4, IFT generally remained greater than about 19 mN/m over the course of the experiment, further indicating conditions for formation of a precipitant. Furthermore, for samples B5-B10, IFT generally decreased over time, indicating less formation of a precipitant during the course of the experiment, when compared with cations in samples B1-B4.

Experiment 3: Interfacial Tension with Crude Oil

Figure 4A:
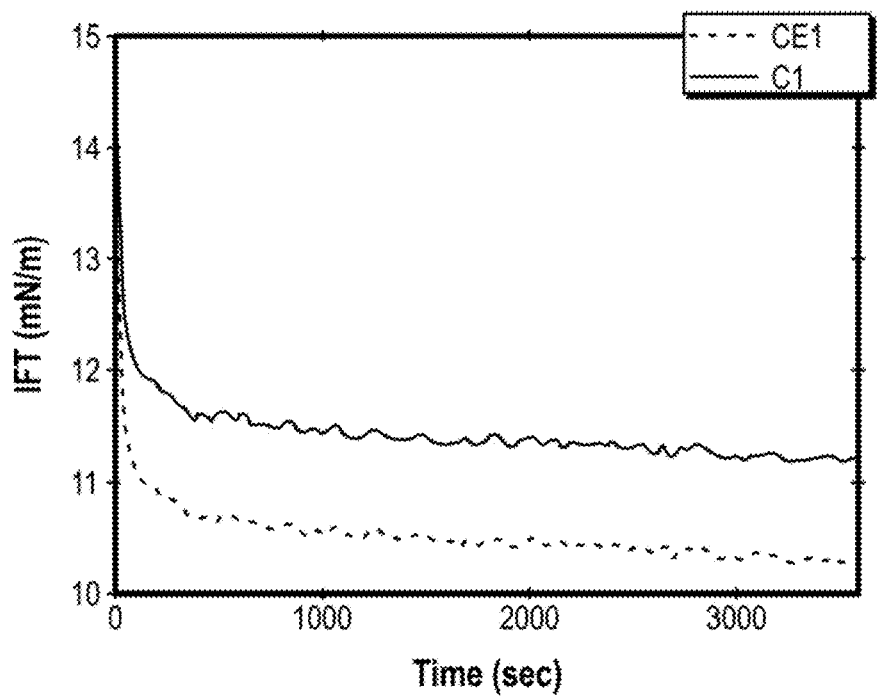
FIGS. 4A-4C are graphs of interfacial tension as a function of time for example compositions.
Figure 4B:
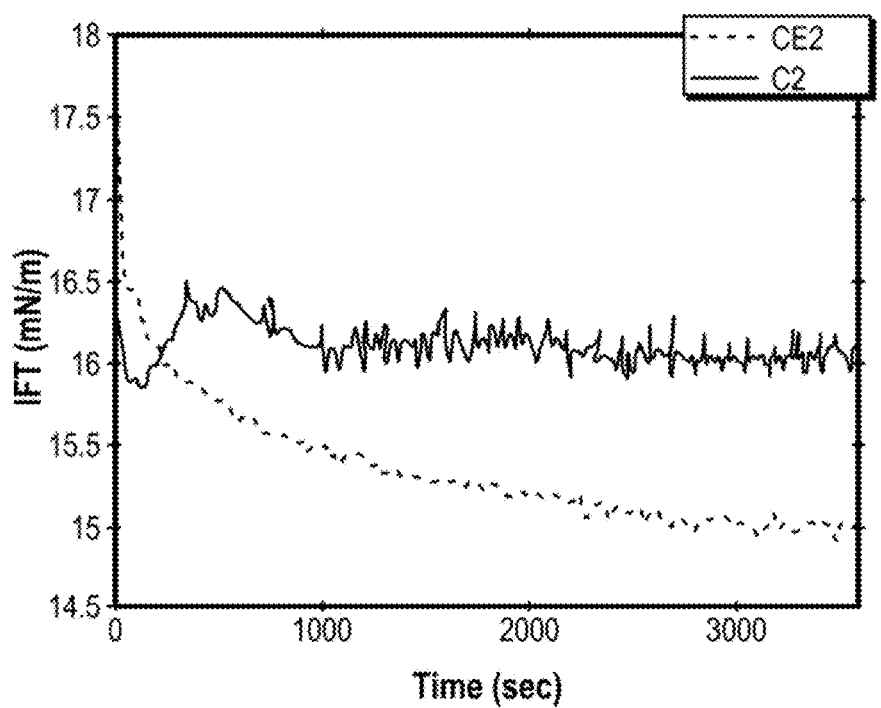
Figure 4C:
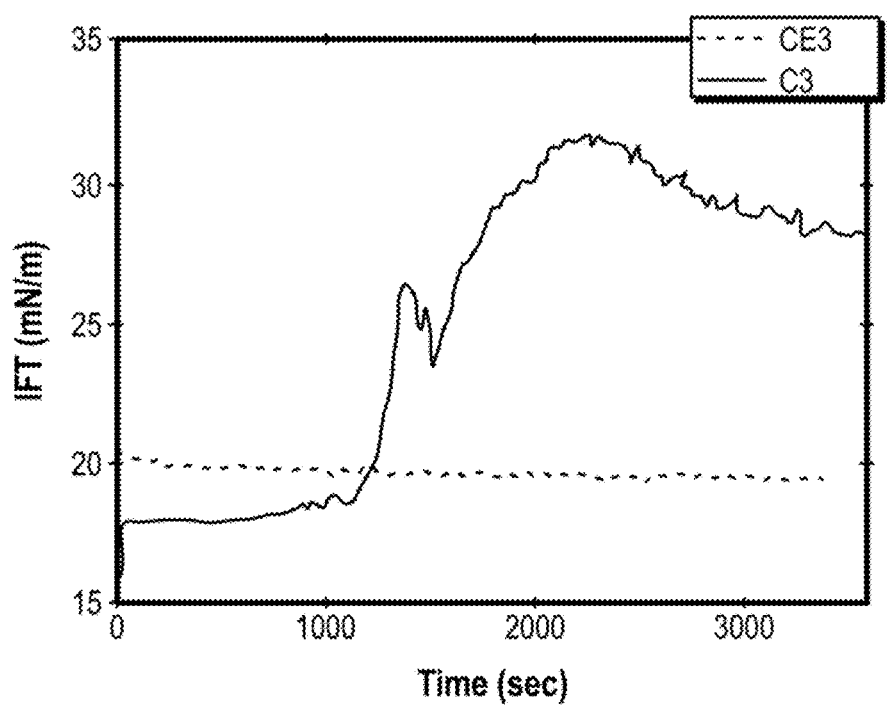

Sample compositions C1-C3 were formed including 1 M (mol/L) Zn2+ metal cations and 1.6 wt % crude oils having total acid numbers (TAN) of 1.9 mg KOH/g, 2.8 mg KOH/g, and 3.3 mg KOH/g, respectively. Samples were formed with an aqueous fluid (water). Furthermore comparative examples CE1-CE3 were formed with 1.6 wt % crude oils having total acid numbers (TAN) of 1.9 mg KOH/g, 2.8 mg KOH/g, and 3.3 mg KOH/g, respectively, with aqueous fluid (water) as a carrier. Interfacial tension (IFT) measurements were taken with an Attension Theta Optical Tensiometer (Biolin Scientific) for all samples over a course of 3,000 seconds. Results of testing for samples C1 and CE1 are shown in FIG. 4A; for samples C2 and CE2 in FIG. 4B; and for samples C3 and CE3 in FIG. 4C. As shown, at higher TAN (such as TAN of 3.3 mg KOH/g) the addition of $Zna^{2+}$ to crude oil led to increased IFT over the course of the experiment, as compared to crude oil with lower TAN (such as TAN of 1.9 mg KOH/g).

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation used herein are merely for purposes of convention and referencing and are not to be construed as limiting. However, it is recognized these terms could be used with reference to an operator or user. Accordingly, no limitations are implied or to be inferred. In addition, the use of ordinal numbers (such as first, second, third, etc.) is for distinction and not counting. For example, the use of "third" does not imply there must be a corresponding "first" or "second." Also, if used herein, the terms "coupled" or "coupled to" or "connected" or "connected to" or "attached" or "attached to" may indicate establishing either a direct or indirect connection, and is not limited to either unless expressly referenced as such.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

What is claimed is:

1. A method comprising:
    introducing a fatty acid salt comprising dodecanoic acid and a metal cation comprising a copper (II) cation, a neodymium (III) cation, a cerium (III) cation, a zinc (II) cation, or any combination thereof to a subterranean reservoir, wherein the subterranean reservoir comprises oleaginous hydrocarbons;
    contacting the fatty acid salt with the oleaginous hydrocarbons in the absence of a viscosifying agent, wherein the fatty acid salt and the oleaginous hydrocarbons form a precipitant; and
    recovering oleaginous hydrocarbons from the subterranean reservoir.

2. The method of claim 1, wherein introducing the fatty acid salt to the subterranean reservoir comprises:
    introducing a first aqueous fluid comprising the dodecanoic acid to the subterranean reservoir; and
    introducing a second aqueous fluid comprising the metal cation to the subterranean reservoir; wherein the dodecanoic acid and the metal cation react within the subterranean reservoir to form the fatty acid salt.

3. The method of claim 2, wherein the dodecanoic acid has a concentration of about 0.5 wt % to about 2.0 wt % in the first aqueous fluid, based on a total weight of the first aqueous fluid.

4. The method of claim 2, wherein the metal cation has a concentration of about 2,500 ppm to about 10,000 ppm in the second aqueous fluid, based on a total weight of the second aqueous fluid.

5. The method of claim 1, further comprising:
    mixing the dodecanoic acid and the metal cation to form the fatty acid salt; and
    introducing the fatty acid salt to the subterranean reservoir.

6. The method of claim 1, further comprising introducing an aqueous flooding fluid into the subterranean reservoir.

7. The method of claim 6, wherein the aqueous flooding fluid comprises:
    an aqueous fluid with 1,000 ppm to 150,000 ppm total dissolved solids (TDS).

8. The method of claim 6, wherein the aqueous flooding fluid comprises a polymer.

9. The method of claim 1, wherein the metal cation is a component of a metal chloride salt.

10. The method of claim 1, wherein the metal cation is selected from late transition metals.

11. The method of claim 1, wherein the oleaginous hydrocarbon comprises petroleum or crude oil.

12. The method of claim 1, wherein contacting the fatty acid salt with the oleaginous hydrocarbons promotes formation of a plurality of clusters comprising the oleaginous hydrocarbons and the fatty acid salt, crystallization of the oleaginous hydrocarbons and the fatty acid salt, or any combination thereof.

13. A method comprising:
  introducing a first aqueous solution comprising dodecanoic acid and a second aqueous solution comprising a metal cation comprising a copper (II) cation, a neodymium (III) cation, a cerium (III) cation, a zinc (II) cation, or any combination thereof to a subterranean reservoir, wherein the subterranean reservoir comprises oleaginous hydrocarbons;
  mixing the dodecanoic acid and the metal cation to form a fatty acid salt;
  contacting the fatty acid salt with the oleaginous hydrocarbons in the absence of a viscosifying agent, wherein the fatty acid salt and the oleaginous hydrocarbons form a precipitant; and
  recovering oleaginous hydrocarbons from the subterranean reservoir.

14. A method comprising:
  introducing dodecanoic acid and a metal cation comprising a copper (II) cation, a neodymium (III) cation, a cerium (III) cation, a zinc (II) cation, or any combination thereof to a subterranean reservoir, wherein the subterranean reservoir comprises oleaginous hydrocarbons;
  reacting the dodecanoic acid and the metal cation to form a fatty acid salt;
  contacting the fatty acid salt with the oleaginous hydrocarbons in the absence of a viscosifying agent, wherein the fatty acid salt and the oleaginous hydrocarbons form a precipitant; and
  introducing an aqueous flooding fluid into the subterranean reservoir after introduction of the fatty acid salt.

15. The method of claim 14, wherein introducing the fatty acid and the metal cation to the subterranean reservoir comprises:
  introducing a first main slug comprising the dodecanoic acid and the metal cation to the subterranean reservoir, wherein the first main slug has a first dodecanoic acid concentration, and wherein the first main slug has a first metal cation concentration;
  introducing a second main slug comprising the dodecanoic acid and the metal cation to the subterranean reservoir, wherein the second main slug has a second dodecanoic acid concentration, and wherein the second main slug has a second metal cation concentration; and
  wherein the first dodecanoic acid concentration is different from the second dodecanoic acid concentration, and wherein the first metal cation concentration is different from the second metal cation concentration.

* * * * *